US010011950B2

(12) United States Patent
Ogiwara

(10) Patent No.: US 10,011,950 B2
(45) Date of Patent: Jul. 3, 2018

(54) PAPERMAKING FELT AND MANUFACTURING METHOD THEREOF

(71) Applicant: Ichikawa Co., Ltd., Bunkyo-ku (JP)

(72) Inventor: Yasuyuki Ogiwara, Bunkyo-ku (JP)

(73) Assignee: Ichikawa Co., Ltd., Bunkyo-ku (JP)

( * ) Notice: Subject to any disclaimer, the term of this patent is extended or adjusted under 35 U.S.C. 154(b) by 18 days.

(21) Appl. No.: 15/206,602

(22) Filed: Jul. 11, 2016

(65) Prior Publication Data
US 2017/0022666 A1    Jan. 26, 2017

(30) Foreign Application Priority Data
Jul. 21, 2015   (JP) ................. 2015-155470

(51) Int. Cl.
| | |
|---|---|
| D21F 7/08 | (2006.01) |
| B29C 53/56 | (2006.01) |
| D21F 1/00 | (2006.01) |
| D04H 13/00 | (2006.01) |
| D21F 7/12 | (2006.01) |
| B32B 5/22 | (2006.01) |

(52) U.S. Cl.
CPC ............ *D21F 7/083* (2013.01); *B29C 53/56* (2013.01); *D04H 13/003* (2013.01); *D21F 1/0081* (2013.01); *D21F 7/08* (2013.01); *D21F 7/12* (2013.01); *B32B 5/22* (2013.01)

(58) Field of Classification Search
CPC ... D21F 7/08; D21F 7/083; D21F 7/10; D21F 7/12; D21F 1/0081; B29C 53/56; B29C 53/562; B29C 53/58; B29C 53/581; B32B 5/22; B32B 5/24; B32B 5/26

USPC .......... 162/348, 358.1, 358.2, 900, 902–904; 156/184, 195, 425, 426; 428/190, 192, 428/193, 195, 196; 28/110, 141, 142; 442/270, 272, 274, 187, 188
See application file for complete search history.

(56) References Cited

U.S. PATENT DOCUMENTS

| | | | |
|---|---|---|---|
| 4,511,361 A * | 4/1985 | Shah .................. | D06P 5/003 139/383 A |
| 5,360,656 A * | 11/1994 | Rexfelt .............. | D06H 5/005 139/383 A |
| 5,713,399 A | 2/1998 | Collette et al. | |
| 5,785,818 A | 7/1998 | Fekete et al. | |
| 5,916,421 A | 6/1999 | Yook | |

(Continued)

FOREIGN PATENT DOCUMENTS

| | | |
|---|---|---|
| DE | 10 2007 000 579 A1 | 4/2009 |
| EP | 1 067 238 A2 | 1/2001 |

(Continued)

*Primary Examiner* — Eric Hug
(74) *Attorney, Agent, or Firm* — Oblon, McClelland, Maier & Neustadt, L.L.P.

(57) ABSTRACT

There is provided a papermaking felt comprising a base fabric layer and at least one batt layer integrated with the base fabric layer,
wherein the base fabric comprises at least one layer formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and thereby joining the side edges together; and
a plurality of marks is arranged at regular intervals in a warp direction of the band-shaped body.

17 Claims, 2 Drawing Sheets

(56) References Cited

U.S. PATENT DOCUMENTS

| | | |
|---|---|---|
| 5,939,176 A | 8/1999 | Yook |
| 6,117,274 A | 9/2000 | Yook |
| 6,162,518 A | 12/2000 | Korfer |
| 6,240,608 B1 | 6/2001 | Paquin et al. |
| 6,265,048 B1 | 7/2001 | Rydin et al. |
| 6,350,336 B1 | 2/2002 | Paquin |
| 6,565,713 B2 | 5/2003 | Hansen et al. |
| 6,723,208 B1 | 4/2004 | Hansen |
| 6,776,878 B2 | 8/2004 | Yook |
| 7,101,599 B2 | 9/2006 | Moriarty |

FOREIGN PATENT DOCUMENTS

| | | |
|---|---|---|
| GB | 1157609 A | 7/1969 |
| JP | 6-503385 | 4/1994 |
| JP | 10-226978 | 8/1998 |
| JP | 10-513511 | 12/1998 |
| JP | 2000-27089 | 1/2000 |
| JP | 2000-80584 | 3/2000 |
| JP | 2000-80585 | 3/2000 |
| JP | 2000-80586 | 3/2000 |
| JP | 2000-509772 | 8/2000 |
| JP | 2000-303378 | 10/2000 |
| JP | 2001-3290 | 1/2001 |
| JP | 2001-40594 | 2/2001 |
| JP | 2004-510896 | 4/2004 |
| JP | 2004-526877 | 9/2004 |
| JP | 2005-521807 | 7/2005 |
| JP | 2006-504873 | 2/2006 |
| WO | WO 97/20105 A1 | 6/1997 |

* cited by examiner

PAPERMAKING FELT AND MANUFACTURING METHOD THEREOF

CROSS REFERENCE TO RELATED APPLICATION(S)

This application is based upon and claims benefit of priority from Japanese Patent Application No. 2015-155470, filed on Jul. 21, 2015, the entire contents of which are incorporated herein by reference.

BACKGROUND

The present invention relates to a papermaking felt used for a papermaking machine (hereinafter occasionally referred to as simply a "felt") and a method for producing the same.

A papermaking machine that removes water from the source material of paper generally includes a wire part, a press part, and a drier part. The wire part, the press part, and the drier part are arranged in this order along the wet paper web conveyance direction. The wet paper web moves through the papermaking machine in a band shape, with a certain width in the direction (cross-machine direction, CMD) perpendicular to the running direction of the papermaking machine (machine direction, MD), and is conveyed to be squeezed to remove water and finally dried in the drier part while being sequentially passed through the papermaking equipments provided in the wire part, the press part, and the drier part.

The press part comprises a plurality of press apparatuses that is provided side by side in series along the wet paper web conveyance direction. Each press apparatus comprises an endless felt or a felt, in which ends of an ended felt are connected on the papermaking machine into an endless shape, and a pair of rolls (i.e., a roll press), which are arranged facing each other in the vertical direction to sandwich a part of the felts, or a cylindrical belt comprising a roll and a shoe (i.e., a shoe press), and uses the felt together with the rolls or the cylindrical belt including a roll and a shoe to press and apply pressure to the wet paper web conveyed by the felt running at a substantially constant speed in the fixed direction and thus dehydrates the wet paper web continuously.

Water squeezing capability, smoothness, running stability, etc. are required as functions for the felt used for the press apparatus. The water squeezing capability refers to a capability to remove water contained in the wet paper web. To achieve this function, it is important that the felt have a good compression recovery property, that is, when the felt is not under pressure, a space (void volume) for removing the water of the felt exist in the felt, and when the felt is under pressure, the density of the felt be maximized and the volume of the space be reduced to discharge the water to the outside of the felt. It is also important that the water squeezing capability be maintained during a period of use of the felt and that the removed water be not return to the wet paper web (re-wetting prevention).

The smoothness refers to the smoothness of the surface of the wet paper web and the surface of the felt (including the surface of the felt under pressure). Since the wet paper web is pressed via the felt, the surface condition of the felt is transferred to the surface of the wet paper web. Hence, to smooth the surface of the wet paper web, it is necessary to smooth the surface of the felt (including the surface of the felt under pressure).

The running stability refers to the capability of the endless felt placed in the press apparatus to run stably without the occurrence of deviation, meandering, vibration, waving, etc.

There are various kinds of paper, such as paper for newspapers, high-quality paper, paperboards, and household paper, and there are also various kinds of papermaking machines that produce these kinds of paper. Various kinds of papermaking felt are currently produced to fit these kinds of paper and papermaking machines; in general, the felt is formed by integrating a batt layer of a nonwoven fiber material with a base fabric layer. The base fabric layer may be, for example, a woven fabric formed of monofilament yarns, monofilament twisted yarns, multifilament yarns, or multifilament twisted yarns, and the woven fabric may be a single-woven article or a multiple-woven article, or may be a laminated structure, in which these are laminated together. The yarn can be usually made of a material produced by extrusion-molding a synthetic polymer resin that a person skilled in the technical field of papermaking equipments uses for this objective, such as a polyamide resin or a polyester resin, or animal fibers such as wool or vegetable fibers such as cotton or hemp.

As the base fabric layer mentioned above, there are various kinds of woven fabric, such as one in which weaving is performed on a weaving machine to obtain an endless shape (hollow weaving), one in which ends of an ended woven fabric obtained by plain weaving are sewn together into an endless shape, and one in which seam loops are formed at each of the two ends in the cross-machine direction of an ended woven fabric, the seam loops at both ends are engaged with each other on a papermaking machine, and a core line is inserted into their common holes to form an endless shape.

In any case, the base fabric layer has an endless form or is configured to allow its ends to be joined together into an endless form, and the length dimension and the width dimension of the base fabric layer (felt) are dimensions corresponding to each papermaking machine. Since the papermaking machines have various dimensions, the base fabric of the felt is produced completely in a made-to-order manner as a matter of course.

In the case where base fabric layers matched with various dimensions are woven with a weaving machine, the productivity is very poor and the yield is poor. In order to produce these base fabric layers more efficiently, a method in which a band-shaped body with a width smaller than the width dimension of the papermaking felt is spirally wound, the ends of the band-shaped body are joined together, and the base fabric formed is used as the base fabric layer of the papermaking felt is proposed (e.g. JP H06-503385T, JP H10-226978A, JP 2000-027089A, JP 2000-303378A, JP 2001-040594A, JP 2004-510896T, JP 2004-526877T, and JP 2006-504873T). Further, a method in which a band-shaped body narrower than the width dimension of the papermaking felt is spirally wound, the ends of the band-shaped body are joined together, the base fabric formed is folded, and a seam loop is formed at the fold (e.g. JP H10-513511T, JP 2000-080585A, JP 2000-080586A, and JP 2005-521807T), and a method in which a band-shaped body narrower than the width dimension of the papermaking felt is spirally wound, the ends of the band-shaped body are joined together, and the formed base fabric and an endless base fabric are laminated together (e.g. JP 2000-509772T, JP 2000-080584A, and JP 2001-003290A) are proposed.

SUMMARY

Although the base fabric layers using a band-shaped body of the papermaking felt disclosed in the prior art literatures mentioned above can be produced very efficiently, it is so difficult to spirally wind in such a manner that the adjacent parts of the band-shaped body agree with the length dimension of the papermaking felt, and there has been a possibility that the length dimension of the felt will vary in the width direction of the papermaking felt (in each wound portion of the band-shaped body). Consequently, there has been a possibility that, in a part of the papermaking felt, nonuniformity will occur in the water squeezing capability and the smoothness due to the density difference or the difference in the mass per unit area, and waving and an abnormality in the running performance will be caused due to the dimension difference.

An object of the present invention is to provide a papermaking felt that comprises a base fabric layer comprising at least one layer formed by spirally winding a band-shaped body narrower than the width of the papermaking felt and at least one batt layer integrated with the base fabric layer and in which the water squeezing capability, the smoothness, and the running stability are improved and a method for producing the same.

The present invention eliminates the variation in the length dimension of the papermaking felt between winding portions of the band-shaped body narrower than the width of the papermaking felt and makes uniform the length dimension of the papermaking felt over the entire width of the base fabric layer formed by spirally winding the band-shaped body, and thus can achieve the objective; specifically, the present invention uses the following technology.

(1) A papermaking felt comprising a base fabric layer and at least one batt layer integrated with the base fabric layer, wherein the base fabric comprises at least one layer formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and thereby joining the side edges together; and a plurality of marks is arranged at regular intervals in a warp direction of the band-shaped body.

(2) The papermaking felt according to (1), wherein the mark is a mark obtained by placing at least one weft yarn with a different color from the ground weft yarn.

(3) The papermaking felt according to (2), wherein a material of the weft yarn with a different color and a material of the ground weft yarn are the same material.

(4) The papermaking felt according to (2) or (3), wherein a fineness of the weft yarn with a different color and a fineness of the ground weft yarn are the same fineness.

(5) The papermaking felt according to any one of (2) to (4), wherein the mark is a mark obtained by placing the weft yarn with a different color one in number.

(6) The papermaking felt according to any one of (2) to (5), wherein the mark is a mark obtained by placing the weft yarn with a different color one in number as a substitute for one of the ground weft yarns in the same structure as the band-shaped body.

(7) The papermaking felt according to (1), wherein the mark is a cotton yarn.

(8) The papermaking felt according to (7), wherein a fineness of the cotton yarn is 450 d or less.

(9) The papermaking felt according to (1), wherein the mark is a light-storing yarn.

(10) The papermaking felt according to (1), wherein the mark is a luminescent yarn.

(11) The papermaking felt according to (1), wherein the mark is a mark obtained by coloring a part of the band-shaped body.

(12) The papermaking felt according to any one of (1) to (11), wherein an interval of the marks is a regular interval in a range of 1 cm to 500 cm.

(13) The papermaking felt according to any one of (1) to (12), wherein an interval of the marks is a regular interval in a range of 2 cm to 100 cm.

(14) The papermaking felt according to any one of (1) to (13), wherein an interval of the marks is a regular interval in a range of 5 cm to 50 cm.

(15) The papermaking felt according to any one of (1) to (14), wherein the marks, which are adjacent in the width direction of the band-shaped body, are arranged at regular intervals in a warp direction of the band-shaped body.

(16) The papermaking felt according to any one of (1) to (14), wherein the marks of each band-shaped body, which are adjacent in the width direction of the band-shaped body, are placed in a straight line in a width direction of the band-shaped body.

(17) A method for producing a papermaking felt, the felt comprising a base fabric layer including at least one layer formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and thereby joining the side edges together, wherein a plurality of marks is arranged at regular intervals in a warp direction of the band-shaped body, and at least one batt layer integrated with the base fabric layer, the method comprising:

arranging the marks of the band-shaped body, which are adjacent in the width direction of the band-shaped body, at regular intervals in the warp direction of the band-shaped body or in a straight line in a width direction of the band-shaped body.

(18) A method for producing a papermaking felt, comprising providing a band-shaped body having a width smaller than a width of the papermaking felt and having a plurality of ground warp yarns, a plurality of ground weft yarns, a first side edge, and a second side edge wherein a plurality of marks is arranged at regular intervals in a warp direction of the band-shaped body, spirally winding the band-shaped body in such a manner that the first side edge and the second side edge are adjacent and that the marks of adjacent parts of the band-shaped body are arranged at regular intervals in the warp direction of the band-shaped body or in a straight line in a width direction of the band-shaped body, and thereby joining the adjacent first and second side edges together.

By the above configuration, in the papermaking felt according to the present invention, even when using a base fabric layer formed by spirally winding a band-shaped body having a width smaller than the width of the papermaking felt and having a plurality of ground warp yarns, a plurality of ground weft yarns, a first side edge, and a second side edge in such a manner that the first side edge and the second side edge are adjacent and thereby joining the side edges together, there is no variation in the length dimension between wound portions and the length dimension is uniform over the entire width of the base fabric layer formed by spirally winding the band-shaped body. Thus, a papermaking felt with an improved water squeezing capability, smoothness, and running stability and a method for producing the same can be provided

DETAILED DESCRIPTION OF THE EMBODIMENT(S)

Figure 1:
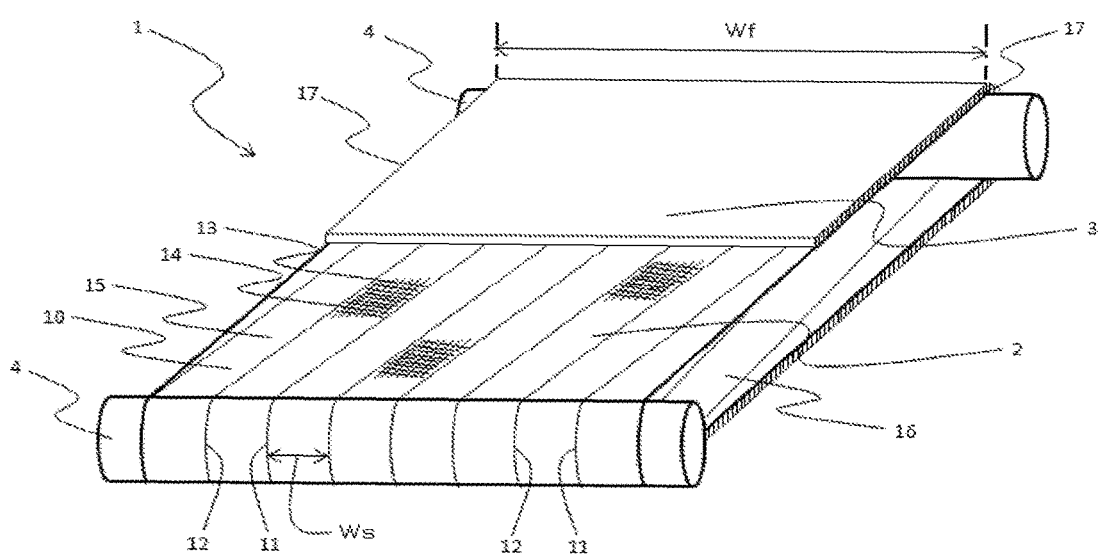
FIG. 1 is a perspective view showing an example of the papermaking felt of an embodiment of the present invention.

Hereinafter, referring to the appended drawings, preferred embodiments of the present invention will be described in detail. FIG. 1 is a perspective view showing an example of the papermaking felt according to an embodiment of the present invention. A felt 1 is a papermaking felt 1 that comprises a base fabric layer 2 and a batt layer 3 integrated with the base fabric layer 2. The base fabric layer 2 is formed by spirally winding a band-shaped body 10 having a width Ws smaller than the width Wf of the papermaking felt and having a plurality of ground warp yarns 13, a plurality of ground weft yarns 14, a first side edge 11, and a second side edge 12 in such a manner that the first side edge 11 and the second side edge 12 are adjacent and thereby joining the side edges (the first side edge 11 and the second side edge 12, which are adjacent to each other) together. For the plurality of ground warp yarns 13 and the plurality of ground weft yarns 14, only parts of them are shown in the figures It is self-evident that the direction of the felt length dimension of the band-shaped body 10 parallel to the ground warp yarn 13 and the machine direction (MD) is provided with a certain angle determined by the width Ws of the band-shaped body and the felt length dimension L, as a matter of course. Although in FIG. 1 part of the batt layer 3 is omitted for ease of understanding, actually the batt layer 3 is placed uniformly at least over the entire wet paper web-side surface 15 of the base fabric layer 2. Also a plurality of marks arranged in the warp direction of the band-shaped body 10 is omitted. Further, in the present specification, the felt length dimension L refers to a perimeter of the papermaking felt 1.

Although the base fabric layer 2 of the felt illustrated in FIG. 1 is a base fabric layer formed by winding the band-shaped body 10 right-handed, also a base fabric layer formed by winding the band-shaped body 10 left-handed may be used. Further, a laminated body of these may be used as the base fabric layer 2. Further, as the base fabric layer 2, a laminate may be used of a base fabric layer formed by spirally winding the band-shaped body 10 mentioned above and a known base fabric such as a woven fabric that is woven into an endless shape on a weaving machine, a woven fabric in which ends of an ended plain-woven fabric are sewn together into an endless shape, or a woven fabric in which seam loops are formed at the two ends in the cross-machine direction of an ended woven fabric, the seam loops at both ends are engaged with each other on a papermaking machine, and a core line is inserted into their common holes to form an endless shape.

As the material of the ground warp yarn 13 and the ground weft yarn 14 of the band-shaped body 10 and the batt layer 3, polyesters (polyethylene terephthalate, polybutylene terephthalate, and the like), aliphatic polyamides (polyamide 6, polyamide 66, polyamide 11, polyamide 12, polyamide 612, and the like), an aromatic polyamide (an aramid), polyvinylidene fluoride, polypropylene, a polyetheretherketone, polytetrafluoroethylene, polyethylene, wool, cotton, a metal, etc. may be used. As the ground warp yarn 13 and the ground weft yarn 14, a monofilament single yarn, a monofilament twisted yarn, a multifilament single yarn, or a multifilament twisted yarn of the material mentioned above may be used. The form such as the fineness and the length of the ground warp yarn 13, the ground weft yarn 14, and the batt layer 3 is not particularly limited, and may be selected as appropriate in accordance with the design.

The form of the band-shaped body 10 may be a woven fabric using the material mentioned above, but is not limited to woven fabrics, and a lattice-like material in which ground warp yarns and ground weft yarns are arranged vertically may be used.

Figure 2:
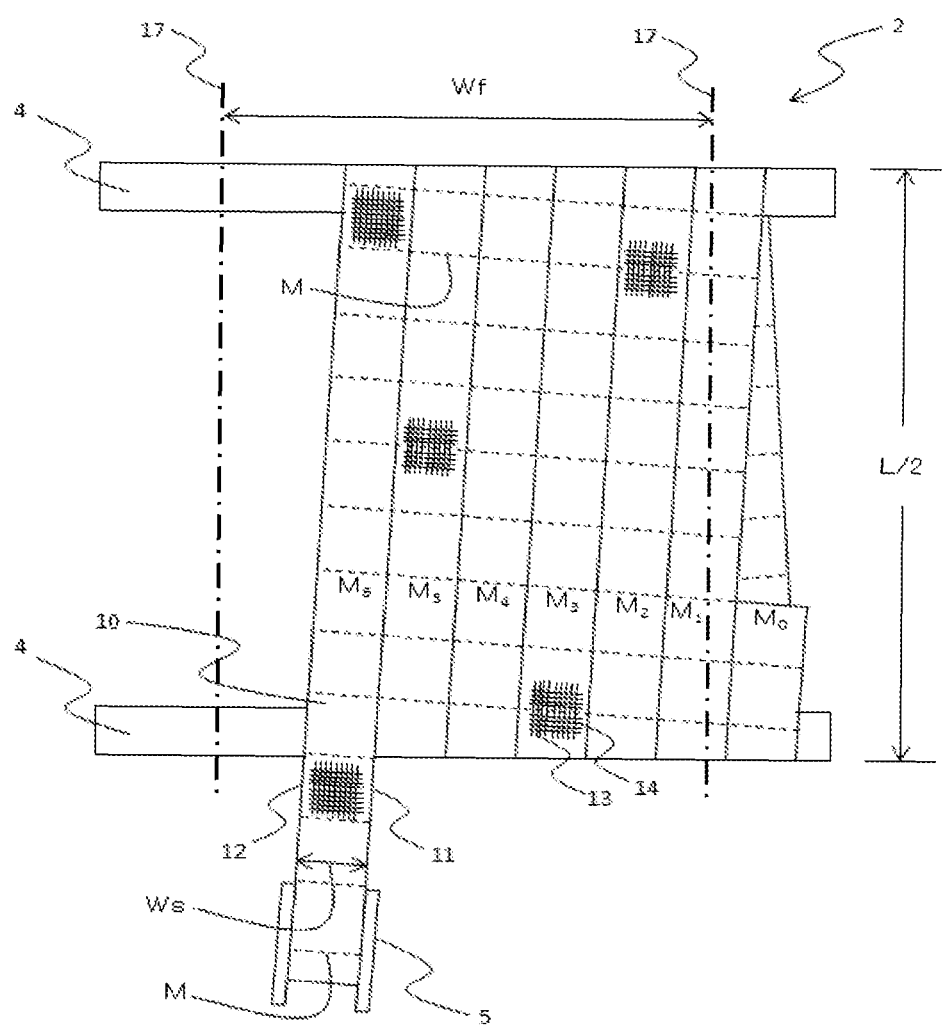
FIG. 2 is a top view showing an example of the base fabric layer of the papermaking felt of an embodiment of the present invention and a method for producing the same.

FIG. 2 shows an example of a base fabric layer of the papermaking felt according to the present embodiment. As shown in FIG. 2, a plurality of marks M is arranged at regular intervals in a warp direction of the band-shaped body 10. With these marks M, the papermaking felt 1 is configured to be determined the nonuniformity of its length dimension over its width direction. In the embodiment shown in the figures, the marks M of each band-shaped body 10, are placed in a straight line in a width direction of the band-shaped body 10. Thus, it is determined that each length of the band-shaped body 10 in one wound is uniform, and that the length dimension over the width direction of the papermaking felt 1 is uniform. The present invention is not limited to the embodiments shown in the figures, and marks M, which are adjacent in the width direction, may be arranged at regular intervals in a warp direction of the band-shaped body 10. Also in this case, the length dimension over the width direction of the papermaking felt 1 is uniform.

As the mark M, at least one yarn with a different color from the ground weft yarn 14 of the band-shaped body 10 may be placed, and the material and the fineness of the mark M at this time may be the same as or different from those of the ground weft yarn 14 mentioned above. As an example of the mark M, preferably one weft yarn with a different color is placed as a substitute for one ground weft yarn 14 in the same structure as the band-shaped body 10.

Also a cotton yarn may be used as the mark M, and in this case the fineness of the cotton yarn is preferably 450 d (denier) or less.

Since a yarn with a different color from the ground weft yarn 14 is used for the mark M described above, there is no problem with the characteristics required for the felt; but there is a case where the yarn with a different color stands out on the surface of the finished papermaking felt and the appearance may be poor. Thus, in order to prevent poor appearance, a light-storing yarn or a luminescent yarn may be used for the mark M so that the light-storing yarn or the luminescent yarn serves as a mark during joining by emitting light only when the side edge portions of the band-shaped body 10 are joined together.

For example, in the case where a light-storing yarn is used as the mark M, the light-storing yarn is irradiated with light before the side edge portions of the band-shaped body 10 are joined together, and the light-storing yarn emits light only during the joining of the side edge portions; thereby, the light-storing yarn can be used as a mark when the light-storing yarns of adjacent parts of the band-shaped body 10 are joined together in a straight line. Further, for example, in the case where a luminescent yarn (e.g. an ultraviolet luminescent yarn) is used as the mark M, the luminescent yarn is irradiated with light (e.g. ultraviolet light) when the side edge portions of the band-shaped body 10 are joined together, and the luminescent yarn emits light only when the side edge portions are joined together; thereby, the luminescent yarn can be used as a mark when the luminescent yarns of adjacent parts of the band-shaped body 10 are joined together in a straight line.

In any case, the mark M may be any mark that serves as a mark during the joining of the side edge portions of the band-shaped body 10 in such a manner that large spots are not given to the natural structure of the band-shaped body 10, the felt length dimension L can be determined accurately, and neither mesh spots nor spots of the mass per unit area occur in any part of the base fabric layer 2. Thus, the yarn described above may not necessarily be used as the mark M, but a part of the band-shaped body 10 may be colored to be used as the mark M.

The interval of the marks M arranged at regular intervals in the warp direction of the band-shaped body 10 may be 1 cm to 500 cm, preferably 2 cm to 100 cm, and more preferably 5 cm to 50 cm. When the interval of the marks M is narrow, the accuracy, with which the length dimension L of the papermaking felt 1 is determined, and the accuracy, with which the natural structure in any part of the base fabric layer 2 is made uniform, are improved, but as a concern, it is troublesome to count the number of marks M from mark $M_0$ to mark $M_1$. Thus, two or more different kinds of marks described above may be used as the mark M, and thereby the concern can be solved. For example, marks $M_A$ that are different from the ground weft yarn 14 only in color may be arranged as a substitute for the ground weft yarn 14 at intervals of 5 cm in the warp direction of the band-shaped body 10, and marks $M_B$ that are different from the ground weft yarn 14 and the mark $M_A$ only in color may be arranged as a substitute for the mark $M_A$ at intervals of 100 cm.

Here, an example of a method for producing the papermaking felt according to a preferable embodiment of the present invention will be described. The method for producing a papermaking felt according to the present embodiment comprises:

providing a band-shaped body having a width smaller than a width of the papermaking felt and having a plurality of ground warp yarns, a plurality of ground weft yarns, a first side edge, and a second side edge wherein a plurality of marks is arranged at regular intervals in a warp direction of the band-shaped body, and spirally winding the band-shaped body in such a manner that the first side edge and the second side edge are adjacent and that the marks of adjacent parts of the band-shaped body are arranged at regular intervals in the warp direction of the band-shaped body or in a straight line in a width direction of the band-shaped body, and thereby joining the adjacent first and second side edges together.

Alternatively, in the method for producing a papermaking felt according to the present embodiment, the felt comprises a base fabric layer including at least one layer formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and thereby joining the side edges together, wherein a plurality of marks is arranged at regular intervals in a warp direction of the band-shaped body, and at least one batt layer integrated with the base fabric layer.

The method according to the present embodiment comprises:

arranging the marks of the band-shaped body, which are adjacent in the width direction of the band-shaped body, at regular intervals in the warp direction of the band-shaped body or in a straight line in a width direction of the band-shaped body.

First, there provided a band-shaped body having a width smaller than a width of the papermaking felt and having a plurality of ground warp yarns, a plurality of ground weft yarns, a first side edge, and a second side edge wherein a plurality of marks is arranged at regular intervals in a warp direction. As the band-shaped body, the above mentioned band-shaped body 10 may be employed.

Next, the band-shaped body is spirally wound in such a manner that the first side edge and the second side edge are adjacent and that the marks of adjacent parts of the band-shaped body are arranged at regular intervals in the warp direction of the band-shaped body or in a straight line in a width direction of the band-shaped body, and thereby joining the adjacent first and second side edges together. Herewith, at least one layer of the base fabric layer can be obtained.

The method for forming the base fabric layer 2 will be more specifically explained below. FIG. 2 is a top view showing an example of the base fabric layer of the papermaking felt according to an embodiment of the present invention and a method for producing the same. As shown in FIG. 2, the base fabric layer 2 is formed by, while rotating rolls 4 and a stock roll 5 of the band-shaped body, performing spiral winding around the two parallel arranged rolls (the rolls that determine the felt length dimension L), with an end (mark) $M_0$ of the band-shaped body 10 as a starting point, in such a manner that the first side edge 11 and the second side edge 12 of the band-shaped body 10 are adjacent and joining the side edges together until the width Wf of the felt is ensured. At this time, the stock roll 5 moves left in accordance with the conditions of fabrication of the base fabric layer 2.

Marks M are arranged at fixed intervals in the band-shaped body 10 wound around the stock roll 5. Thus, the length dimension L of the papermaking felt 1 can be set by determining the number of marks M from mark $M_0$ to mark $M_1$ that are arranged in the warp direction of the band-shaped body 10. Since the determined number of marks M is determined also for from mark $M_1$ to mark $M_2$ through from mark $M_n$ to mark $M_{n+1}$ similarly, a fixed felt length dimension L is always obtained for any wound portion, and the length dimension L has no variation over the entire width Wf of the felt.

Furthermore, since the band-shaped body 10 is spirally wound and joined such that marks M form a straight line over adjacent parts of the band-shaped body 10, neither mesh spots nor spots of the mass per unit area of the base fabric layer 2 occur in any part of the base fabric layer 2.

Since in the band-shaped body 10 the marks M described above are arranged at regular intervals in the warp direction of the band-shaped body 10, the length dimension L of the papermaking felt can be determined without using the two rolls 4 illustrated in FIG. 2. That is, the first side edge 11 and the second side edge 12 of the band-shaped body 10 may be arranged while the number of marks M from mark $M_0$ to mark $M_1$ is determined to obtain the desired felt length dimension L. Thus, the two rolls 4 may not necessarily be used, but simply parts of the band-shaped body 10 may be arranged adjacently and joined together directly. The numbers of marks M from mark $M_1$ to mark $M_2$ through from mark $M_n$ to mark $M_{n+1}$ are made the same as the number of marks M from mark $M_0$ to mark $M_1$ by winding and arranging parts of the band-shaped body 10 without bending the band-shaped body 10 in such a manner that the marks M of adjacent parts of the band-shaped body 10 are in a straight line.

The method for joining the side edges of adjacent parts of the band-shaped body 10 together is not particularly limited; the side edge portions of adjacent parts of the band-shaped body 10 can be joined together using sewing together with a sewing machine, melting, fusion adhesion, etc. Side edge portions are preferably made adjacent and joined together to such a degree that there is no gap. Side edge portions may overlap approximately several millimeters; in the present specification, also the case where side edge portions overlap approximately several millimeters is included in the concept of being made adjacent.

The desired papermaking felt 1 can be obtained by integrating the batt layer 3 with the base fabric layer 2 obtained in the above and performing cutting with the felt width dimension Wf parallel to the felt running direction. Although the cutting with the felt width dimension Wf may be performed on the base fabric layer 2, usually in this case, in view of the dimension change in a post-process, a width larger than the felt width dimension Wf is ensured and cutting is performed with the desired felt width dimension Wf in the final process.

The mass per unit area of the papermaking felt 1 is not particularly limited, but the papermaking felt 1 is usually produced with 500 g/m² to 2000 g/m², and the mass per unit area is selected as appropriate in accordance with the grade of the paper to be produced by papermaking and the part where the papermaking felt 1 is used in the papermaking machine. The thickness of the papermaking felt 1 is not particularly limited, but the papermaking felt 1 is usually produced with 1.5 mm to 5.0 mm in accordance with mainly the mass per unit area.

EXAMPLE

Hereinafter, the present invention will be described more specifically by means of Examples. However, the following Examples are mere examples of the present invention and the present invention should not be limited to those Examples.

First, following band-shaped body was provided.
<Band-Shaped Body>
Warp yarn: a colorless, transparent monofilament single yarn made of polyamide 6 with 1200 dtex
Weft yarn: a colorless, transparent monofilament single yarn made of polyamide 6 with 1200 dtex
Mark: a blue monofilament single yarn made of polyamide 6 with 1200 dtex
Structure: 40 warp yarns/5 cm, 40 weft yarns/5 cm, a 1/1 plain structure, the width of the band-shaped body: 100 cm
The mark was inserted for every 40 weft yarns (every 5 cm) as a substitute for the weft yarn.
Next, with the provided band-shaped body, following base fabric layer was produced.
<Base Fabric Layer>
As the base fabric layer, a laminate of a base fabric layer 1 and a base fabric layer 2 described below was prepared.
Base fabric layer 1: while the band-shaped body mentioned above was spirally wound such that the marks of adjacent parts of the band-shaped body were in a straight line and the felt length dimension was 15.0 m, the first side edge portion and the second side edge portion were sewn together with a sewing machine. The width dimension of the base fabric layer 1 was set to 650 cm (the felt width dimension was set to 520 cm).

Base fabric layer 2: the same piece as the base fabric layer 1 was prepared and inverted. That is, the base fabric layer 1 and the base fabric layer 2 are of the same material and structure and are different in the direction of winding of the band-shaped body.
<Papermaking Felt>
For the papermaking felt, a 500 g/m² short batt fiber of polyamide 6 with a fineness of 11 dtex was entangled and integrated by needling with the wet paper web-side surface of the base fabric layer mentioned above, and a 200 g/m² short batt fiber of polyamide 6 with a fineness of 13 dtex was entangled and integrated by needling with the machine-side surface of the base fabric layer; the processes of drying and curing were performed; and finally cutting was performed with the felt width dimension of 520 cm.

When the papermaking felt mentioned above is used in a papermaking machine, the water squeezing capability, the smoothness, and particularly the running stability are expected to be improved. This is because, even using a base fabric layer formed by spirally winding a band-shaped body having a width smaller than the width of the papermaking felt and having a plurality of ground warp yarns, a plurality of ground weft yarns, a first side edge, and a second side edge in such a manner that the first side edge and the second side edge are adjacent and thereby joining the side edge portions together, there is no variation in the length dimension between wound portions and the length dimension of the papermaking felt is uniform over the entire width of the base fabric layer formed by spirally winding the band-shaped body, and neither mesh spots nor spots of the mass per unit area have occurred in any part of the base fabric layer.

The base fabric layer mentioned above may be used for a base fabric layer of any papermaking equipment, such as a papermaking wire, a belt for wet paper web conveyance, and a belt for shoe pressing having a similar structure of the base fabric layer as well as a base fabric layer of the papermaking felt.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:
1. A method for producing a papermaking felt,
the felt comprising
a base fabric layer including at least one layer formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and thereby joining the side edges together, wherein a plurality of marks is arranged at regular intervals in a warp direction of the band-shaped body, and
at least one batt layer integrated with the base fabric layer,
the method comprising:
arranging the marks of the band-shaped body, which are adjacent in the width direction of the band-shaped body, at regular intervals in the warp direction of the band-shaped body or in a straight line in a width direction of the band-shaped body.
2. A method for producing a papermaking felt, comprising:

providing a band-shaped body having a width smaller than a width of the papermaking felt and having a plurality of ground warp yarns, a plurality of ground weft yarns, a first side edge, and a second side edge wherein a plurality of marks is arranged at regular intervals in a warp direction of the band-shaped body, and spirally winding the band-shaped body in such a manner that the first side edge and the second side edge are adjacent and that the marks of adjacent parts of the band-shaped body are arranged at regular intervals in the warp direction of the band-shaped body or in a straight line in a width direction of the band-shaped body, and thereby joining the adjacent first and second side edges together.

3. The method for producing papermaking felt according to claim 1, wherein the mark is a mark obtained by placing at least one weft yarn with a different color from the ground weft yarn.

4. The method for producing papermaking felt according to claim 3, wherein a material of the weft yarn with a different color and a material of the ground weft yarn are the same material.

5. The method for producing papermaking felt according to claim 3, wherein a fineness of the weft yarn with a different color and a fineness of the ground weft yarn are the same fineness.

6. The method for producing papermaking felt according to claim 3, wherein the mark is a mark obtained by placing the weft yarn with a different color one in number.

7. The method for producing papermaking felt according to claim 3, wherein the mark is a mark obtained by placing the weft yarn with a different color one in number as a substitute for one of the ground weft yarns in the same structure as the band-shaped body.

8. The method for producing papermaking felt according to claim 1, wherein the mark is a cotton yarn.

9. The method for producing papermaking felt according to claim 1, wherein a fineness of the cotton yarn is 450 d or less.

10. The method for producing papermaking felt according to claim 1, wherein the mark is a light-storing yarn.

11. The method for producing papermaking felt according to claim 1, wherein the mark is a luminescent yarn.

12. The method for producing papermaking felt according to claim 1, wherein the mark is a mark obtained by coloring a part of the band-shaped body.

13. The method for producing papermaking felt according to claim 1, wherein an interval of the marks is a regular interval in a range of 1 cm to 500 cm.

14. The method for producing papermaking felt according to claim 1, wherein an interval of the marks is a regular interval in a range of 2 cm to 100 cm.

15. The method for producing papermaking felt according to claim 1, wherein an interval of the marks is a regular interval in a range of 5 cm to 50 cm.

16. The method for producing papermaking felt according to claim 1, wherein the marks, which are adjacent in the width direction of the band-shaped body, are arranged at regular intervals in a warp direction of the band-shaped body.

17. The method for producing papermaking felt according to claim 1, wherein the marks of each band-shaped body, which are adjacent in the width direction of the band-shaped body, are placed in a straight line in a width direction of the band-shaped body.

* * * * *